INVENTORS
RALPH C. FREVIK
BRUNO BRILTS
BY
P. F. Hilder
ATTORNEY

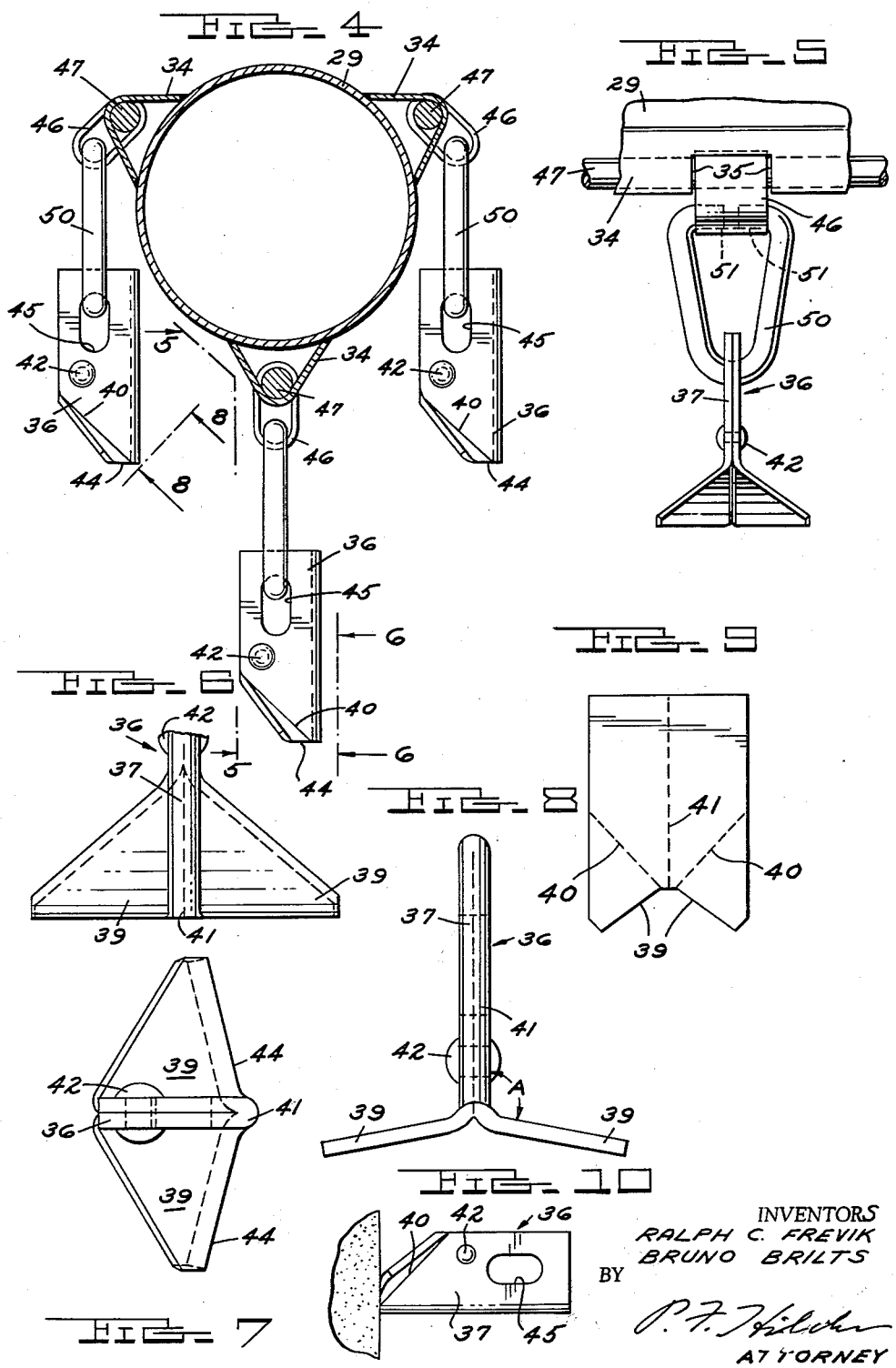

United States Patent Office 3,122,871
Patented Mar. 3, 1964

3,122,871
FLAIL TYPE CUTTER
Ralph C. Frevik, Detroit, and Bruno Brilts, Royal Oak, Mich., assignors to Ford Motor Company, Dearborn, Mich., a corporation of Delaware
Filed Nov. 29, 1961, Ser. No. 155,568
4 Claims. (Cl. 56—294)

This invention relates to flail type cutters and mowers.

Flail type cutters generally are of the "impact cut" type, in which a cutter is provided with a cutting edge which is moved sufficiently rapidly to cut grass and other light growth merely by impact rather than by shearing action between a pair of blades. The flail type cutter of the present invention is of this type, the cutting blades being mounted for rotation about a horizontal axis (parallel with the ground).

The cutting blades of the cutter are formed to provide a cutting edge projecting on both sides of a central shank and extending parallel to the axis of the cutter. The blades are forwardly inclined to provide for shedding of the cut material by centrifugal force.

The cutting blades are mounted on a rotated blade carrier by a linkage permitting the blades to swing backwardly or move inwardly upon striking an obstruction, the blades during operation extending generally radially from the carrier. The linkage retains the blades against accidental loss, but permits rapid replacement of any blade without disturbing the rest of the blades.

Among the objects of the present invention are to provide an improved flail type cutter construction which will cut more evenly to uniform height; to provide such a machine that is more durable and dependable in operation; to provide a machine having a reduced number of cutting blades and in which the cutting blades are easily changed; and generally to improve cutters of the type disclosed.

Other objects, and objects relating to details and economies of construction will be apparent from the detailed description to follow:

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 4 is an enlarged cross section of the blade carrier, taken on the line 4—4 of FIGURE 3, the cutting blades being shown at rest.

FIGURE 5 is an enlarged rear elevation of one of the cutting blades, a portion of the blade carrier and the linkage connecting the blade and blade carrier being shown.

FIGURE 6 is an enlarged front elevation of the lower portion of one of the blades.

FIGURE 7 is a top plan view of one of the blades.

FIGURE 8 is a front oblique view of one of the blades, viewed generally from the line 8—8 of FIGURE 4.

FIGURE 9 is a schematic elevation, indicating the manner in which a blade is formed from a single sheet of metal stock.

FIGURE 10 is a schematic view indicating how the blades may be sharpened.

Figure 1:
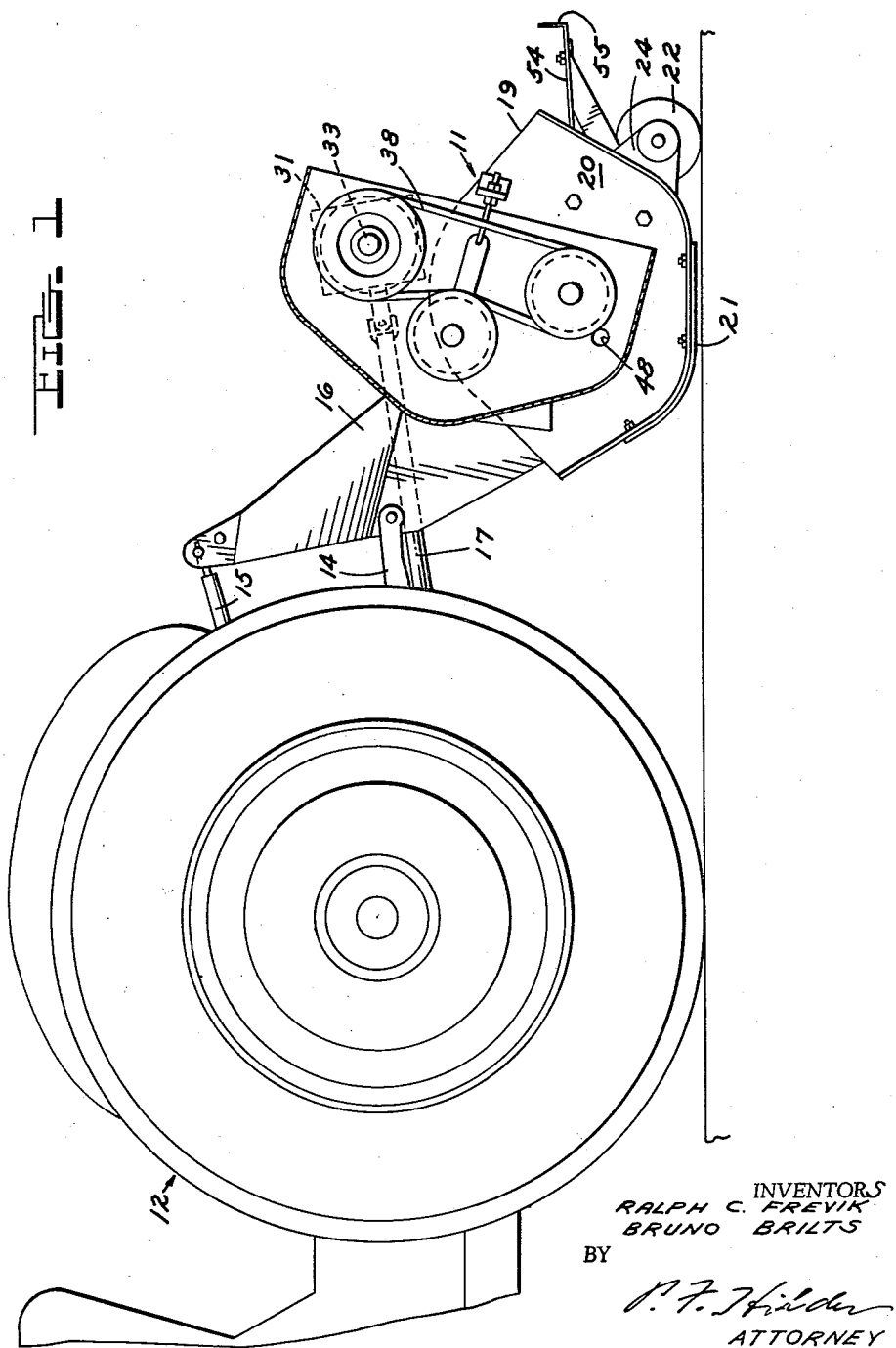
FIGURE 1 is a side elevation of a tractor with the cutter of the present invention mounted thereon, only a portion of the tractor being shown.

Referring now to FIGURE 1, the flail type cutter 11 of the present invention is adapted to be mounted on a tractor 12 having a three-point hitch including a pair of power liftable draft links, one draft link 14 being shown, and a top link 15. The links 14 and 15 are pivotally connected to the frame 16 of the cutter. A power take-off shaft 17 extends from the tractor to the implement to drive the implement in a manner to be described.

The cutter includes a housing 19 which is generally semi-cylindrical and is provided with end walls 20 having skids 21 at the lower edges. The housing 19 is mounted in the frame 16.

A roller 22 is rotatably supported on a pair of arms 24 which are mounted on the end walls 20 of the housing 19. The arms 24 are adjustable to vary the spacing between the roller 22 and the rear edge 25 of the housing 19. The provisions for adjustment of the arms may consist of a plurality of holes 26 located along an arc for receiving a bolt for holding each arm 24 in position. In operation, the roller 22 rests upon the ground and in transport the entire implement is lifted, being carried on the links 14 and 15 of the tractor.

A blade carrier 27 is journaled in the end walls 20 of the housing, extending between the end walls co-axial with the housing. The blade carrier 27 consists of a tube 29 provided with concentric end shafts 30 journaled within the end walls 20 of the housing and connected to be driven by the power take-off shaft 17 through a right angle drive gear box 31 and a shaft 33 and belt 38.

Figure 3:
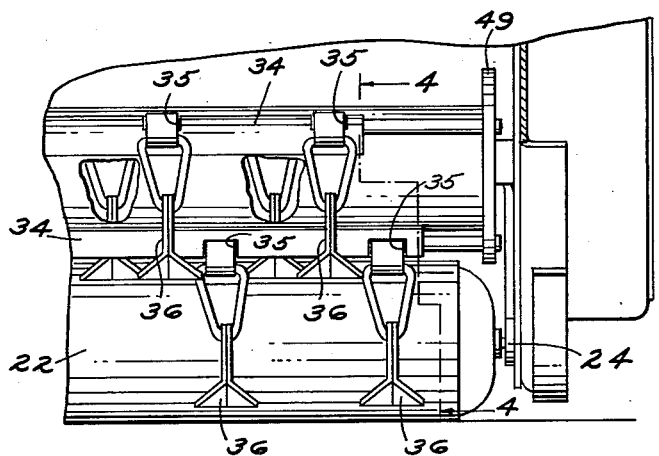
FIGURE 3 is a front elevation of a portion of the cutter, the cutting blades being shown at rest and a portion of the housing being broken away.

The blade carrier 27 includes three longitudinally extending generally V-shaped channel members 34 secured to the tube 29 at 120 degree intervals as indicated in FIGURE 3. The channel members 34 have a series of rectangular slots 35 cut therein to receive linkage for attachment of the cutter blades 36, as will be described.

Each cutter blade 36 consists of a straight flat shank portion 37 terminating at its outer end in a pair of cutting portions 39 extending laterally, one on each side of the shank portion. Each cutting portion 39 lies in a plane which intersects the plane of the shank portion 37 along a diagonal line 40 inclined forwardly outwardly of the shank. Preferably, the line 40 makes an angle of about 45 degrees with the length of the shank (see FIGURE 4). The plane of the cutting portion 39 makes an angle A with the plane of the shank portion approaching 90 degrees, preferably being on the order of 100 degrees. The forward angle of the cutting portions 39 is sufficient to provide shedding of material from the top surface of these portions due to centrifugal force and thereby prevents buildup of material thereon.

The planes of the cutting portions 39 should be inclined at least 45 degrees to a plane perpendicular to the center line of the shank in order to assume shedding of the cut material from the inner top surfaces of these portions. If the forward angle of these surfaces is at least 45 degrees, the cutting portions of each blade may lie in a single plane perpendicular to the plane of the shank portion 37. If the forward inclination of these surfaces is decreased, the side inclination (angle between planes of cutting portions and shank) should be increased to preserve an inclination of at least 45 degrees. By increasing the side inclination of the planes of the cutting portions, the rake of the cutting edges of the cutters (rearward angle from the shank portions to the ends of the cutting portions) is increased.

The cutter blade 36 preferably is formed from sheet stock as indicated in FIGURE 9, starting with a flat blank shaped as indicated in that figure and bending the two halves together 180 degrees along the center line 41 and bending the cutting portions 39 outwardly along the lines 49. Preferably, a rivet 42 is passed through the rear of the shank portion 37 to hold the two halves of the shank portion tightly together and prevent the cutting blade fatiguing along the sharp bend at 41 during use.

The forward edges 44 of the cutting portions 39 are beveled to provide a pair of cutting edges extending in a plane perpendicular to the plane of the shank portion 37. Preferably, this is accomplished by grinding the under sides of these portions as generally indicated in FIGURE 10. After a period of use, the blades may be resharpened in the same manner.

If the plane of each cutting portion 39 is bent to form an angle of a little over 90 degrees with the shank portion 37 (100 degrees in the form shown herein), the cutting edges 44 of the plane will have a slight rake extending rearwardly from the shank portion 37 to the outer ends of the portions 39 (see FIGURE 7). This rake facilitates cutting.

Each cutting blade 36 is provided with a hole 45 generally centered in the upper part of the shank portion 37 (see FIGURE 4). The hole 45 preferably is oval, being elongated in the direction along the length of the shank.

The cutting blades 36 are mounted on the blade carrier 27 by a linkage including a series of oval bushings 46 received one within each slot 35 in each channel member 34. A rod 47 extends lengthwise within each channel member 34 and is received within an end plate 49 at each end of the blade carrier tube 29, the plate serving to secure the rods against endwise movement. Any of the bushings 46 may be replaced by partially retracting the rod 47 along the receiving channel member 34. A hole 48 is provided in each end wall 20 of the housing to permit retracting any of the rods. The clearance between the slots 35 and the bushings 46 is such that the bushings may rotate about the rods 47 through an angle of about 90 degrees.

A V-shaped link 50 is received within the hole 45 of each cutting blade 36, the link 50 having spaced, inwardly turned ends 51 which are adapted to be received within the bushings 46 (see FIGURE 5). The arrangement is such that the link 50 may be assembled with cutting blade 36 and then assembled with the bushing 46, after which the bushing is secured to the blade carrier 27 by means of one of the rods 47. After assembly with the rod 47, the link cannot be inclined to a sufficient angle to align the gap between the ends 51 with the wall of the bushing, and therefore the link is positively retained in the bushing.

The slots 35 are equally spaced along the channel members 34 but in staggered relation as indicated in FIGURE 3, the spacing between the slots of any channel member being a little less than three times the lateral width of each blade so that as the blade carrier 27 is rotated, each cutting blade will slightly overlap the path of the preceding blade so as to give a uniform, continuous cut for the entire width of the blades.

Figure 2:
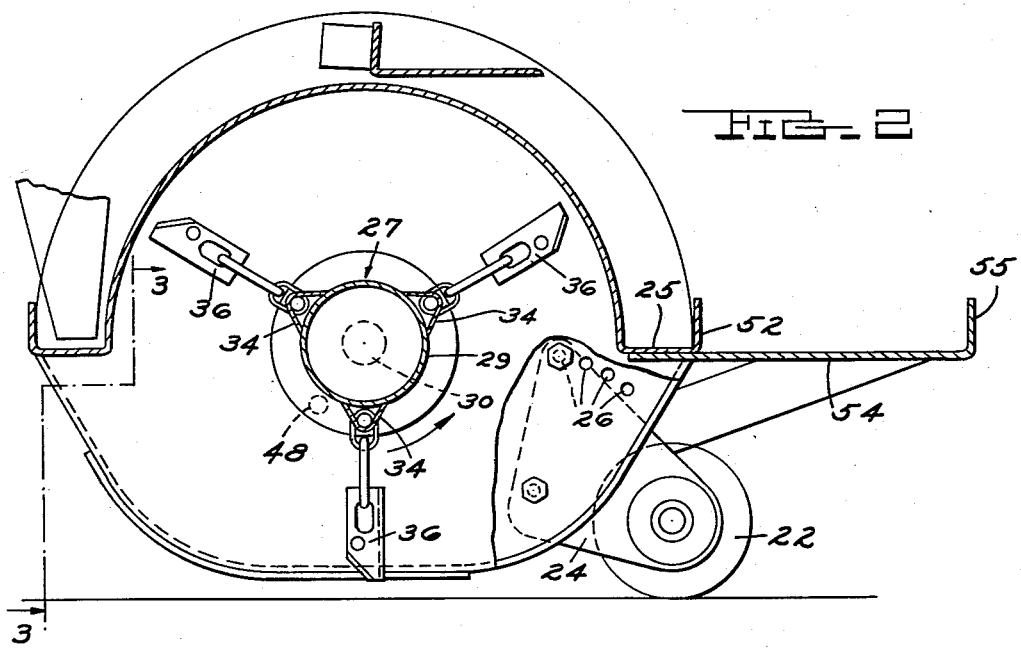
FIGURE 2 is an enlarged vertical section of the cutter, portions of the cutter being shown in side elevation and a portion of the housing being broken away to show details of construction.

Preferably, the blade carrier 27 is rotated counter-clockwise as viewed in FIGURE 2, the blades traveling rearwardly in proximity to the ground in their cutting stroke. The cut material will be swept rearwardly by the blades and by the current of air produced by rotation of the blades, the cut material tending to travel tangentially through the space between the top of the roll 22 and the rear edge of the housing 25. If the throwing of material from the rear of the machine is not disadvantageous, the space behind the lower edge 25 of the housing may be left open to permit free egress of cut material and debris such as dirt and stones which may at times be struck by the cutter blades 36. For this reason, the rear edge 25 of the housing is extended rearwardly only far enough to stiffen the edge of the housing and then provided with an upwardly turned stiffening flange 52.

If it is desired to provide a guard against throwing dirt, stones and debris rearwardly, the rear edge 25 of the housing may be extended rearwardly by a shield 54 extending the entire width of the housing and projecting rearwardly in a horizontal plane. An upwardly directed flange 55 at the rear edge of the shield 54 serves to stiffen the shield against bending. The shield will intercept any material thrown through the gap between the rear edge 25 of the housing and the top of the roller 22 and deflect the material downwardly against the ground. The roller 22 and shield 54 together serve as guards to prevent throwing of material any substantial distance and are of particular advantage in mowing areas adjacent highways or in parks where the hazard of injury from objects thrown by the cutting blades 36 may be substantial.

The linkage connecting the cutting blades 36 with the blade carrier 27, including the link 50 and bushing 46, provides three pivots for free swinging of the blade. At rest, the blades may arrange themselves as indicated in FIGURES 3 and 4. When the blade carrier 27 is rotated at operating speed, the blades extend radially outwardly as indicated in FIGURE 2. However, due to the articulated mounting of each blade, the blade may freely swing rearwardly in the event that the lower end of the blade strikes an obstruction. In addition, due to the elongated hole 45 in the blade, the blade may move bodily upwardly as well as swing rearwardly upon striking an obstruction, thus aiding in preventing damage to blades.

The roller 22 may be adjusted upwardly or downwardly to alter the spacing or gap between the roller and the rear edge 25 of the housing. Heavy, succulent grasses may tend to build up against the rear edge of the housing and require additional space. While moving the roller downwardly tends to raise the cutting height, this may be compensated for by shortening the tractor top link to tilt the implement forwardly and maintain the skids 21 adjacent the ground.

We claim:

1. A cutting blade for a flail type cutter having a blade carrier rotatable on a horizontal axis, the cutting blade having a flat shank portion and cutting portions extending laterally on both sides of the shank portion, the cutting portions lying in planes intersecting the shank portion along a forwardly, outwardly inclined straight line extending transversely of the shank portion and the forward edges of said cutting portions being sharpened to provide a pair of cutting edges lying in a plane perpendicular to the plane of the shank portion, the planes of the cutting portions being inclined at least 45 degrees to a plane perpendicular to the length of the shank portion.

2. A cutting blade as claimed in claim 1, in which the blade is folded from a single sheet of metal to form a tightly folded shank portion of double thickness with the connecting fold extending along the forward edge of said shank portion and the lower ends of the shank portion are turned outwardly from the plane thereof to form the cutting portions.

3. A cutting blade as claimed in claim 2, in which the double thickness of the shank portion is united adjacent the rear edge thereof.

4. A cutting blade as claimed in claim 1, in which the shank portion is provided with a hole generally centered in the upper part thereof, the hole being elongated in the direction along the length of the shank portion.

References Cited in the file of this patent

UNITED STATES PATENTS

| 1,846,459 | Romera | Feb. 23, 1932 |
| 2,479,937 | Knowles | Aug. 23, 1949 |
| 2,680,337 | Whipple | June 8, 1954 |
| 2,691,262 | Swertfeger | Oct. 12, 1954 |

FOREIGN PATENTS

| 1,244,882 | France | Sept. 19, 1960 |